United States Patent
Brueggen et al.

(10) Patent No.: US 10,338,965 B2
(45) Date of Patent: Jul. 2, 2019

(54) MANAGING A SET OF RESOURCES

(75) Inventors: Christopher Michael Brueggen, Allen, TX (US); Harvey Ray, Frederick, CO (US); Derek Alan Sherlock, Boulder, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1315 days.

(21) Appl. No.: 13/438,357

(22) Filed: Apr. 3, 2012

(65) Prior Publication Data

US 2013/0263148 A1 Oct. 3, 2013

(51) Int. Cl.
*G06F 9/455* (2006.01)
*G06F 9/50* (2006.01)
*G06F 9/46* (2006.01)

(52) U.S. Cl.
CPC ............ *G06F 9/5016* (2013.01); *G06F 9/466* (2013.01); *G06F 9/5011* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 5,715,395 A * | 2/1998 | Brabson et al. | 709/226 |
| 6,151,663 A * | 11/2000 | Pawlowski et al. | 711/147 |
| 6,330,630 B1 | 12/2001 | Bell | |
| 6,922,804 B2 | 7/2005 | Sharma | |
| 7,107,367 B1 | 9/2006 | Hughes | |
| 7,124,410 B2 | 10/2006 | Berg | |
| 8,019,920 B2 | 9/2011 | Akkerman | |
| 8,639,816 B2 * | 1/2014 | Turner et al. | 709/226 |
| 2006/0010031 A1 * | 1/2006 | Higuchi et al. | 705/10 |
| 2006/0271544 A1 * | 11/2006 | Devarakonda et al. | 707/9 |
| 2007/0073856 A1 * | 3/2007 | Tsien | 709/223 |
| 2008/0005338 A1 * | 1/2008 | Yin | G06F 12/0817 709/228 |
| 2008/0052342 A1 * | 2/2008 | Koga | 709/201 |
| 2008/0270708 A1 | 10/2008 | Warner | |
| 2009/0094418 A1 * | 4/2009 | Warner et al. | 711/144 |
| 2009/0307386 A1 | 12/2009 | Jin et al. | |
| 2010/0017572 A1 * | 1/2010 | Koka et al. | 711/159 |
| 2011/0307903 A1 * | 12/2011 | Vaddagiri | 718/105 |
| 2013/0160008 A1 * | 6/2013 | Cawlfield et al. | 718/1 |

* cited by examiner

*Primary Examiner* — Francisco J Aponte
*Assistant Examiner* — Kevin X Lu
(74) *Attorney, Agent, or Firm* — Hewlett Packard Enterprise Patent Department (57) ABSTRACT

In one example, a controller for managing a set of resources. A first structure has a first entry statically associated with one of the resources. A second structure has a second entry dynamically associative with one of the resources. A resource sharing mechanism borrows for the second structure an idle resource associated with the first structure.

21 Claims, 8 Drawing Sheets

MANAGING A SET OF RESOURCES

BACKGROUND

Systems, such as computer systems, often manage a set of resources. The resources in the set may be limited in number, or of a fixed or predetermined number. Different components in the system may vie to access a certain number of these resources on an exclusive basis, and for at least a period of time. If a particular component cannot obtain such access to the specified number of resources at the time they are requested, the operation of that component may disadvantageously slow down or even stall, while it is waiting for the resources to be made available to it. This results in a reduction in system throughput, and may also adversely affect the operation of other components in the system as well. Taken to the extreme, system operation may come to a halt.

DETAILED DESCRIPTION

As noted in the Background section, two or more components of a system may vie to obtain for exclusive use, for at least a period of time, a certain number of a limited set of resources. In a computer system, there can be a number of different types of such resources. Some may be hardware resources, such as memory locations or I/O ports. Others may be resources such as transaction identifiers which each identify a particular transaction being performed by a portion of the system.

In the case of some resources, such as transaction identifiers for example, two or more source components ("sources") of the computer system may wish to conduct a transaction with a target component ("target"). The transaction may involve the target performing certain operations desired by the source. A source may begin the transaction by issuing a command to the target to perform the operation. The target then typically takes a period of time, which may be variable, to perform (or "execute") the specified operation. When the target has completed the operation, the target issues a response to the source that indicates the outcome of the operation. The response typically concludes the transaction.

To improve system performance and throughput, the target typically can accept an additional command or commands, from the same source or a different source, while executing a prior command. Transaction identifiers, which can be included in or associated with the commands and responses of transactions, allow the source and target to identify and distinguish the various transactions that are concurrently active at the target. Each active transaction has a different transaction identifier. The number of transaction identifiers in the allowable set of identifiers is typically defined by the target and limited to the maximum number of transactions that can be concurrently active at the target. Where two or more sources are conducting transactions with the same target, the number of concurrent transactions that a particular source may wish to conduct with a particular target can vary over time, and may be dependent upon system workload and operation. At times there may be insufficient resources (transaction identifiers) in the set to accommodate all the desired concurrently active transactions, which can cause some transactions to be delayed. This, in turn, can adversely affect system performance and throughput.

One technique for managing resources, such as transaction identifiers, to mitigate these adverse effects routes all transactions with a particular target through a centralized arbitration point in the system that assigns a resource on demand. However, this adds cost complexity to the system, and may disadvantageously create a throughput bottleneck at the arbitration point. Another technique allocates the set of resources among the various source components in a fixed manner according to anticipated usage. However, to avoid the situation where a source component blocks or stalls due to a lack of sufficient resources, each component should ideally be assigned a number of resources sufficient to accommodate the heaviest load that can be experienced by the component. While dividing up the set of resources among components in a fixed manner can avoid the adverse effects of a centralized arbitration point, in many cases the target has an insufficient number of resources to allocate to each source the number of resources that corresponds to its maximum expected load. When a source component does not have any remaining available ones of its assigned set of resources, the component will block or stall and be unable to issue any new commands to the target until the target completes one of the previous operations for that source and sends the response to the source. Once the response is received by the source, indicating that the operation has been completed by the target, the source can then reuse the resource (e.g. the transaction identifier) for conducting a subsequent transaction with the target.

Referring now to the drawings, there is illustrated an example of a controller for managing a set of resources constructed in accordance with the present disclosure. The controller divides up a fixed or limited set of resources among two or more source components, and allows idle resources assigned to one component to be borrowed for use by another component when its demand for resources exceeds its supply of idle resources. The controller advantageously allows components to share resources without using a centralized arbitration point to assign the resources, and minimizes or eliminates blocking or stalling of a source component through the use of resource sharing.

Figure 1:
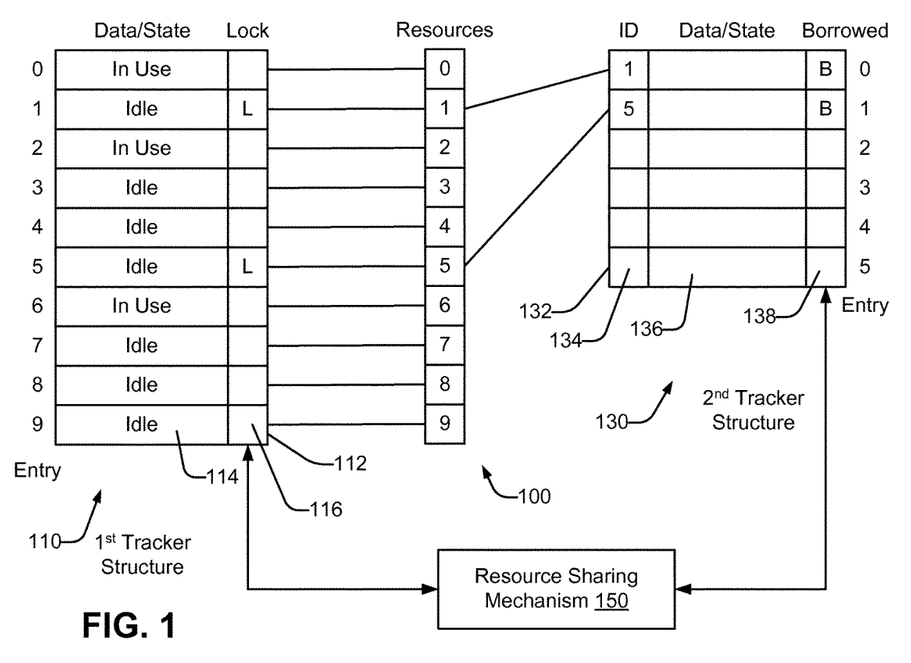
FIG. 1 is a schematic representation of managing a set of resources in accordance with an embodiment of the present disclosure.

Considering now the management of a set of resources, and with reference to FIG. 1, a finite or limited example set of resources 100 is illustrated. The number of resources in the set may be predefined. While ten resources are shown for convenience of illustration, the set 100 may contain any number of resources of a target.

A plurality of tracker structures may be associated with the set of resources 100. Two such tracker structures 110, 130 are illustrated in FIG. 1. Each tracker structure 110, 130 is associated with a different source component (not shown). A plurality of source components, in some examples, may be disposed in a single controller, or split among plural controllers.

As defined herein and in the appended claims, a "tracker structure" shall be broadly understood to mean a data structure that tracks the usage, by an associated component, of resources that are assigned—permanently, temporarily, or intermittently—to the component. The term "usage" shall be broadly understood to mean the state or status of the resource, along with data or other information associated with the resource.

Tracker structures 110, 130 each have plural first tracker entries 112, 132 respectively. For purposes of illustration, first tracker structure 110 includes ten tracker entries 112 numbered 0 through 9, and second tracker structure 130 includes six tracker entries 132 numbered 0 through 5, are illustrated as an example, although each tracker structure 110 may include any number of tracker entries. The term "tracker entry" shall be broadly understood to mean a data field or group of data fields in the tracker structure that is capable of maintaining the state or status of a particular resource, in some cases along with data or other information associated with that resource.

The first tracker structure 110 includes plural entries 112. While the number of tracker entries 112 corresponds to the number of resources in the set 100, this is for ease of illustration, and the tracker structure 110 may include more or fewer tracker entries 112 than the number of resources in the set 100. Each tracker entry 112 includes a data/state field 114, and a lock field 116.

Each of the plural tracker entries 112 is statically associated with a particular one of the resources 100. For example, tracker entry 0 is statically associated with resource 0, while tracker entry 5 is statically associated with resource 5. The data/state field 114 can indicate whether the corresponding resource is currently in use in conjunction with a transaction between a source and a target, or currently idle (i.e. not in use). Having a predetermined static association between a tracker entry and its corresponding resource simplifies the process by which an idle resource can be identified and assigned to a new transaction. As a result, the resource can quickly be assigned to the transaction without incurring the delay of a more complex technique for determining idle resources and assigning them to transactions.

The second tracker structure 130 includes plural entries 132. The tracker structure 130 may include more, fewer, or the same number of tracker entries 132 as the number of resources in the set 100. Each tracker entry 132 includes an identifier field 134, a data/state field 136, and a borrowed field 138.

Each of the plural tracker entries 132 is dynamically associative with a particular one of the resources. In other words, a tracker entry 132 does not have a static association with any resource. Instead, the identifier field 134 identifies which, if any, resource in the set 100 is associated with a particular tracker entry 132. In the example illustrated, resource 1 has been dynamically associated with tracker entry 0; resource 5 has been dynamically associated with tracker entry 1; and no resource is associated with any of tracker entries 2 through 5. Tracker entries 2 through 5 are considered as "Unassigned".

A resource sharing mechanism 150, coupled to the first and second tracker structure 110, 130, is configured to borrow an idle resource associated with a first tracker entry 112 of the first tracker structure 110 and associate the borrowed resource with a second tracker entry 132 of the second tracker structure 130. Typically, the resource sharing mechanism 150 borrows the idle resource when a demand for resources associated with the second tracker structure 130 exceeds a supply of resources that are associated with the second tracker structure 130. For example, an idle resource is borrowed when the source component associated with the second tracker structure 130 is to issue a command to the target component but lacks an idle resource with which to do so.

The resource sharing mechanism 150 borrows an idle resource associated with the first tracker structure 110 by identifying a first tracker entry 112 having an idle state (and which is not presently already borrowed). The resource sharing mechanism 150 may do this by finding a first tracker entry 112 which is in the idle state and which does not have its lock field 116 set. When such an entry 112 is found, the resource sharing mechanism 150 sets the lock field 116 for that entry 112. Setting the lock field 116 (denoted by the value "L") for an entry 112 indicates that the resource associated with this entry 112 has been borrowed for use by another tracker structure such as the second tracker structure 130. While a resource remains borrowed, it will not be used by a source component associated with the first tracker structure 110, and the corresponding tracker entry 112 will remain in the idle state. In addition, since the lock field 116 is set to the value of "L", the resource sharing mechanism 150 will recognize that the corresponding resource is currently borrowed and the mechanism 150 will not attempt to borrow it again.

The resource sharing mechanism 150 may further locate an unassigned entry 132 in the second tracker structure 130, and write the identifier of the resource into the identifier field 134 of that entry 132. In this way, the resource sharing mechanism 150 can dynamically associate the resource with the second tracker entry 132.

In some examples, the resource sharing mechanism 150 may also set the borrowed field 138 for the entry 132 to indicate that the resource which is identified by the identifier field 134 is a resource that has been borrowed from another tracker structure. This may be useful in some applications, as will be discussed subsequently in greater detail with reference to FIG. 5.

The resource sharing mechanism 150 is further configured to return the borrowed resource. Returning the resource borrowed by the second tracker 130 allows the resource to once again be used by a source component associated with the first tracker structure 110. The resource sharing mechanism 150 may return the resource when the supply of resources associated with the second tracker structure exceeds the demand for those resources. The resource sharing mechanism 150 may return the resource by unlocking the first tracker entry that is associated with the borrowed resource. For example, to return resource 5, the resource sharing mechanism 150 would clear the lock field 116 (i.e. remove the "L") of tracker entry 5 in the first tracker structure 110, since this is the entry 112 that is statically associated with resource 5. In conjunction with returning the resource, the resource sharing mechanism 150 also modifies the entry 132 in the second tracker structure 130 to indicate that the resource is no longer borrowed. For example, the resource sharing mechanism 150 may unassign the entry 132. In some examples this may be done by clearing the identifier field 134, changing the data/state field 138, clearing the borrowed field 138, or some combination of these.

The benefits of sharing resources in this manner between two tracker structures can be readily appreciated. In the first tracker structure 110, the predetermined static association between a tracker entry and its corresponding resource allows simply and fast identification of an idle resource and its assignment for use with a new transaction. As such, the first tracker can be associated with transactions that require fast and simple resource assignment. In addition, the first tracker structure 110 can be made sufficiently large so as to statically associate the correspondingly large number of resources to the first tracker structure 110. Furthermore, these resources can be provided to the first tracker structure 110 without preventing the second tracker structure 130 from having access to sufficient resources such that the second tracker structure 130 can operate without blocking or stalling as well. For example, in FIG. 1, the first tracker structure 110 has ten entries 112, representing the maximum number of resources with which the structure 110 can be associated. Second tracker structure 130 has six entries 132, representing the maximum number of resources with which the structure 130 can be associated. The sharing mechanism 150 allows six resources to be borrowed from the first tracker structure 110 for use by the second tracker structure 130. Thus the ten resources in the set 150 can be flexibly apportioned between the two tracker structures 110, 130 based on demand. If the resources were not shareable, a static division of the ten resources between the two structures 110, 130—for example, seven for the first tracker structure 110 and three for the second tracker structure 130—would result in blocks or stalls during peak demand for the resources in one structure or the other.

Figure 2:
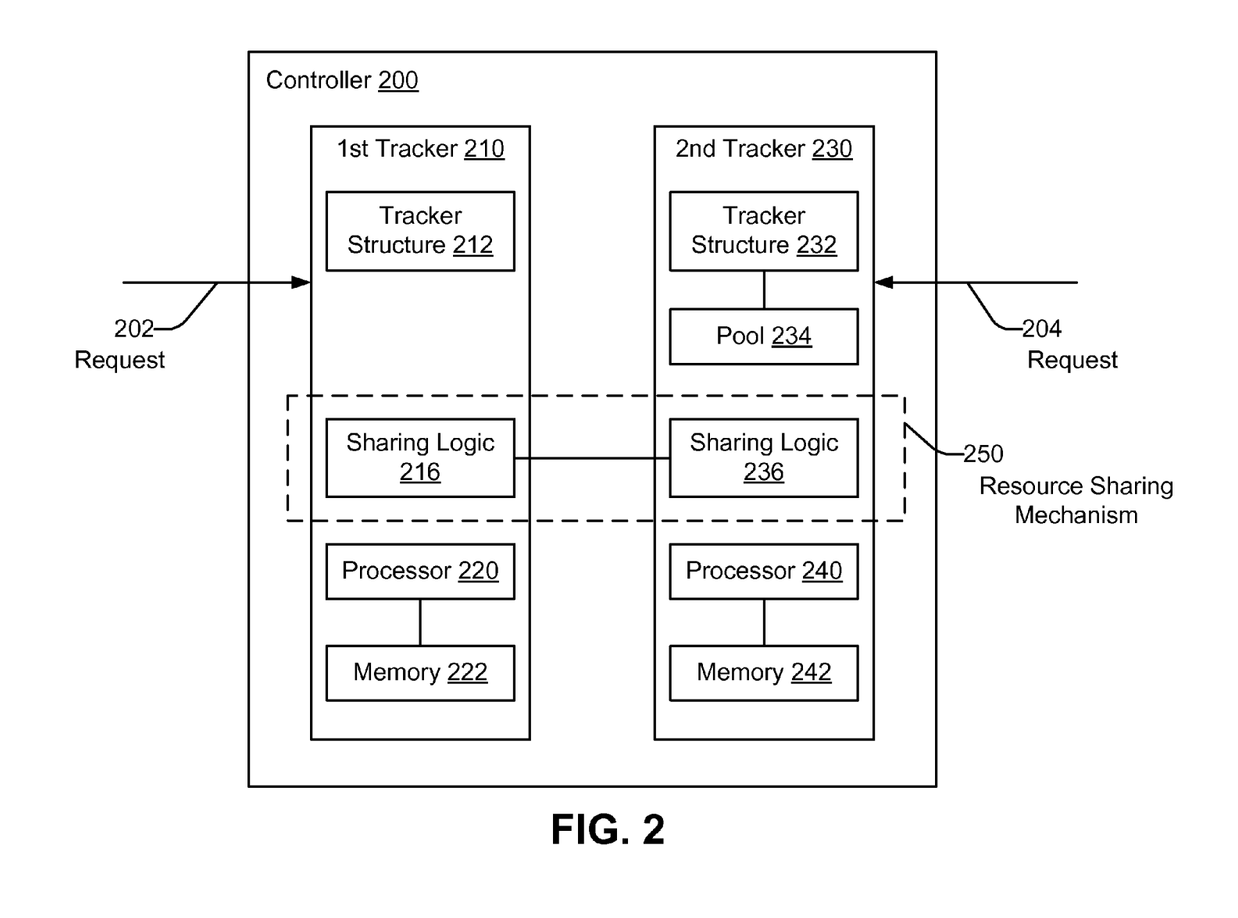
FIG. 2 is a block diagram representation of a controller for managing a set of resources, in accordance with an embodiment of the present disclosure.

Considering now, and with reference to FIG. 2, a controller 200 for managing a set of resources includes a first tracker 210 and a second tracker 230. Each tracker 210, 230 may be considered as a source component that uses a resource in conjunction with a command issued by the tracker to a target component (not shown). In some examples, the set of resources may be the set of resources 150 (FIG. 1).

The first tracker 210 includes a first tracker structure 212. The first structure 212 has plural first entries. Each first entry is statically associated with, and denotes a state of, a corresponding one of the resources. In some examples, each first entry may be a first tracker entry 112 (FIG. 1).

The second tracker 230 includes a second tracker structure 232. The second tracker structure 232 has plural second entries. Each second entry is dynamically associative with a corresponding resource of a variable-size pool 234 of resources assigned to the second tracker 230. Each second entry identifies the corresponding resource. The number of second entries may be the same as or different than the number of first entries. In some examples, each second entry may be a second tracker entry 132 (FIG. 1).

In some examples, the tracker structures 212, 232 may be scoreboard structures. As defined herein and in the appended claims, a "scoreboard structure" (or more simply a "scoreboard") shall be broadly understood to mean a type of tracker structure in which the state of each tracker entry is defined by a set of state bits. As a tracker processes a transaction (e.g. a memory read), the corresponding entry in the tracker structure may transition through multiple states collectively denoted by the value of the state bits, which may be set or cleared in response to various events in the system.

The controller 200 also includes a resource sharing mechanism 250. The resource sharing mechanism 250 includes sharing logic 216 in the first tracker 210 and second sharing logic 236 in the second tracker 230. The resource sharing mechanism 250 is configured to borrow from the first tracker 210 a resource that is in an idle state, and assign that resource to the second tracker 230. The entry in the first structure 212 that corresponds to the borrowed resource is set to the locked state in order to prevent the first tracker 210 from using the borrowed resource. The borrowed resource is added to the resource pool 234, thus increasing the size of (i.e. the number of resources in) the pool 234. When the second tracker 230 is finished using the borrowed resource, the resource sharing mechanism 250 returns the borrowed resource to the first tracker 210. In doing so, the resource sharing mechanism 250 removes or deletes the borrowed resource from a pool of resources in the second tracker 230, and sets the entry in the first structure 212 that corresponds to the returned resource to the unlocked state, which allows the first tracker 210 to subsequently use the returned resource.

A request 202 may be issued to the first tracker 210 by or through the controller 200. In processing the request 202, the first tracker 210 assigns or allocates a resource. Thus the request 202 may be considered a request for a resource.

A request 204 may be issued to the second tracker 230 by or through the controller 200. In processing the request 204, the second tracker 230 assigns or allocates a resource, which may include borrowing a resource from the first tracker 210. Thus the request 204 may also be considered a request for a resource.

The various controllers and trackers of the present disclosure may be implemented using hardware, software, firmware, or a combination of these technologies. Electrical hardware may include discrete or integrated analog circuitry and digital circuitry such as microprocessors, programmable logic devices, and state machines. Firmware or software may be considered as machine (or computer) readable instructions; may define a sequence of logic operations; may be stored in memory, registers, or other machine (or computer) readable media; and may be organized as modules which correspond to various elements of the controllers and trackers. In one example, first tracker 210 may include a machine, such as processor 220, coupled to memory 222, and second tracker 230 may include a machine, such as processor 240, coupled to memory 242. Controller 200 may contain a similar processor and memory arrangement (not shown) outside of trackers 210, 230.

Figure 3:
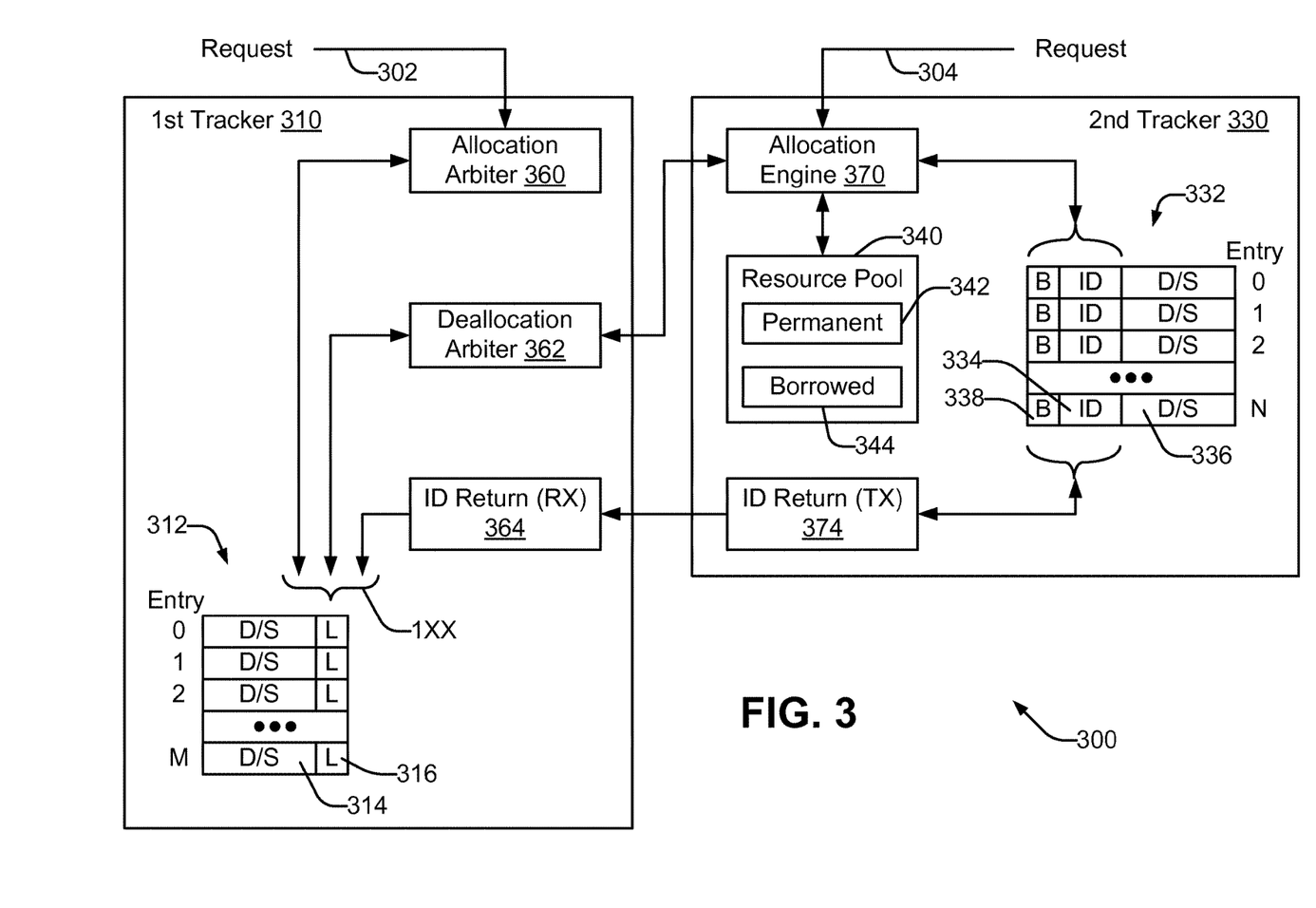
FIG. 3 is a block diagram representation of first and second trackers of a controller for managing a set of resources, in accordance with an embodiment of the present disclosure.

Considering now, and with reference to FIG. 3, a controller 300 for managing a set of resources includes a first tracker 310 and a second tracker 330. In an example, first tracker 310 corresponds to first tracker 210 (FIG. 2); second tracker 330 corresponds to second tracker 230 (FIG. 2); first structure 312 corresponds to first structure 212 (FIG. 2); second structure 332 corresponds to second structure 232 (FIG. 2); and resource pool 340 corresponds to resource pool 234 (FIG. 2). A first request 302 for a resource may be issued to the first tracker 310, and a second request 304 for a resource may be issued to the second tracker 330.

The first structure 312 includes a plurality of first entries, numbered 0 through M. Each entry has a data/state field 314 and a lock field 316. In one example, these fields correspond to those in the first tracker structure 110 (FIG. 1).

The second structure 332 includes a plurality of second entries, numbered 0 through N. Each entry has a resource identifier field 334, a data/state field 336, and a borrowed field 338. In one example, these fields correspond to those in the second tracker structure 130 (FIG. 1).

The resource pool 340 includes a first sub-pool 342 of resources permanently assigned to the second tracker 330, and a sub-pool 344 of resources borrowed from the first tracker 310. By providing the first sub-pool 342 of permanently-assigned resources, the second tracker 330 can provide a resource in response to the request 304 without borrowing a resource from the first tracker 310. The number of resources in the permanently-assigned sub-pool 342 may, in one example, be chosen to accommodate a normal operating load on the second tracker 330 without borrowing any resources from the first tracker 310. However, when a high operating load causes demand for resources to exceed the number of available resources in the permanently-assigned sub-pool 342, the second tracker 330 can borrow available resources from the first tracker 310 and thus continue to operate without blocking or stalling. Thus the second structure 332 is generally sized with a sufficient number of second entries to accommodate the highest expected operating load, which is greater than the number of resources in the permanently-assigned sub-pool.

The controller 310 has a resource sharing mechanism that includes an allocation arbiter 360, a deallocation arbiter 362, and an identifier return receiver 364 in the first tracker 310. In one example, modules 360-364 correspond to the sharing logic 216 (FIG. 2). The resource sharing mechanism also includes an allocation engine 370, and an identifier return transmitter 374 in the second tracker 330. The deallocation arbiter 362 is communicatively coupled to the allocation engine 370. The identifier return receiver 364 is communicatively coupled to the identifier return transmitter 374. In one example, modules 370-374 correspond to the sharing logic 236 (FIG. 2).

The allocation arbiter 360 in the first tracker 310 is configured to receive a request 302 for a resource. In response, the allocation arbiter 360 locates an entry in the first structure 312 whose data/state field 314 indicates an "idle" state for the resource which corresponds to the entry. The allocation arbiter 360 then assigns that resource to the request 302, and changes the value of the data/state field 314 to indicate an "in-use" state for the resource that corresponds to that entry.

The deallocation arbiter 362 offers a resource to the second tracker 330 when the first tracker 310 finishes with its use of the particular resource; in other words, when the data/state field 314 for the entry in the first structure 312 which corresponds to that resource changes from an "in-use" state to the "idle" state. For example, this "in-use" to "idle" transition may occur when the first tracker 310 receives a response from a target that indicates that a transaction for which a particular transaction identifier (resource) has been used has been completed.

The allocation engine 370 in the second tracker 330 determines whether to borrow the resource offered to it by the deallocation arbiter 362 in the first tracker 310. If the allocation engine 370 determines to borrow the offered resource, the engine 370 adds the borrowed resource to the pool 340 of resources associated with the second tracker 330. More specifically, the engine 370 adds the borrowed resource to the borrowed sub-pool 344.

The decision of the allocation engine 370 to either borrow or not borrow the offered resource is communicated to the deallocation arbiter 362. If the allocation engine 370 determines to borrow the offered resource, the deallocation arbiter 362 sets the state of the lock field 316 of the entry in the first structure 312 that corresponds to the borrowed resource to the locked state. This prevents the first tracker 310 from using the borrowed resource while it has been borrowed by the second tracker 230.

The allocation engine 370 in the second tracker 310 is configured to receive a request 304 for a resource. If at least one available resource exists in the pool 340, the allocation engine 370 selects an available resource in response to the request. If the allocation engine 370 determines that no resource in the pool 340 is available to assign to the request 304, the engine 370 determines to borrow a resource offered to the second tracker 330 by the first tracker 310. If the first tracker 310 is not presently offering such a resource to the second tracker 330, the next such resource presented to the second tracker 330 by the first tracker 310 will be borrowed, unless a permanently-assigned or previously-borrowed resource becomes available for use before the next resource is presented.

Once a resource has been selected or borrowed, the allocation engine 370 enters an identifier of the resource in the resource identifier field 334 of an entry in the second structure 332 which is in an "unassigned" state. In some examples, an unassigned entry may be located by finding an entry whose resource identifier field 334 contains a particular value that indicates it is an unassigned entry. In other examples, an unassigned entry may be determined in a different manner. If the selected resource is in the borrowed sub-pool 344, the allocation engine 370 also sets the borrowed field 338 of the entry.

When the allocation engine 370 determines that second tracker 330 is finished using a borrowed resource, that resource is returned to the first tracker 310. The allocation engine 370 sets the entry in the second structure 332 which corresponds to the resource to "unassigned", and removes the resource from the borrowed sub-pool 344. The identifier return transmitter 374 in the second tracker transmits the identifier of the resource to the identifier return receiver 364 in the first tracker 310. The identifier return receiver 364, in turn, clears the state of the lock field 316 of the entry in the first tracker structure 312 that corresponds to the returned resource, in order to unlock the resource and allow its subsequent use by the first tracker 310. Since each resource is statically associated with a known entry in the structure 312, the value of the identifier allows the proper entry to be directly determined by the identifier return receiver 364.

Figure 4:
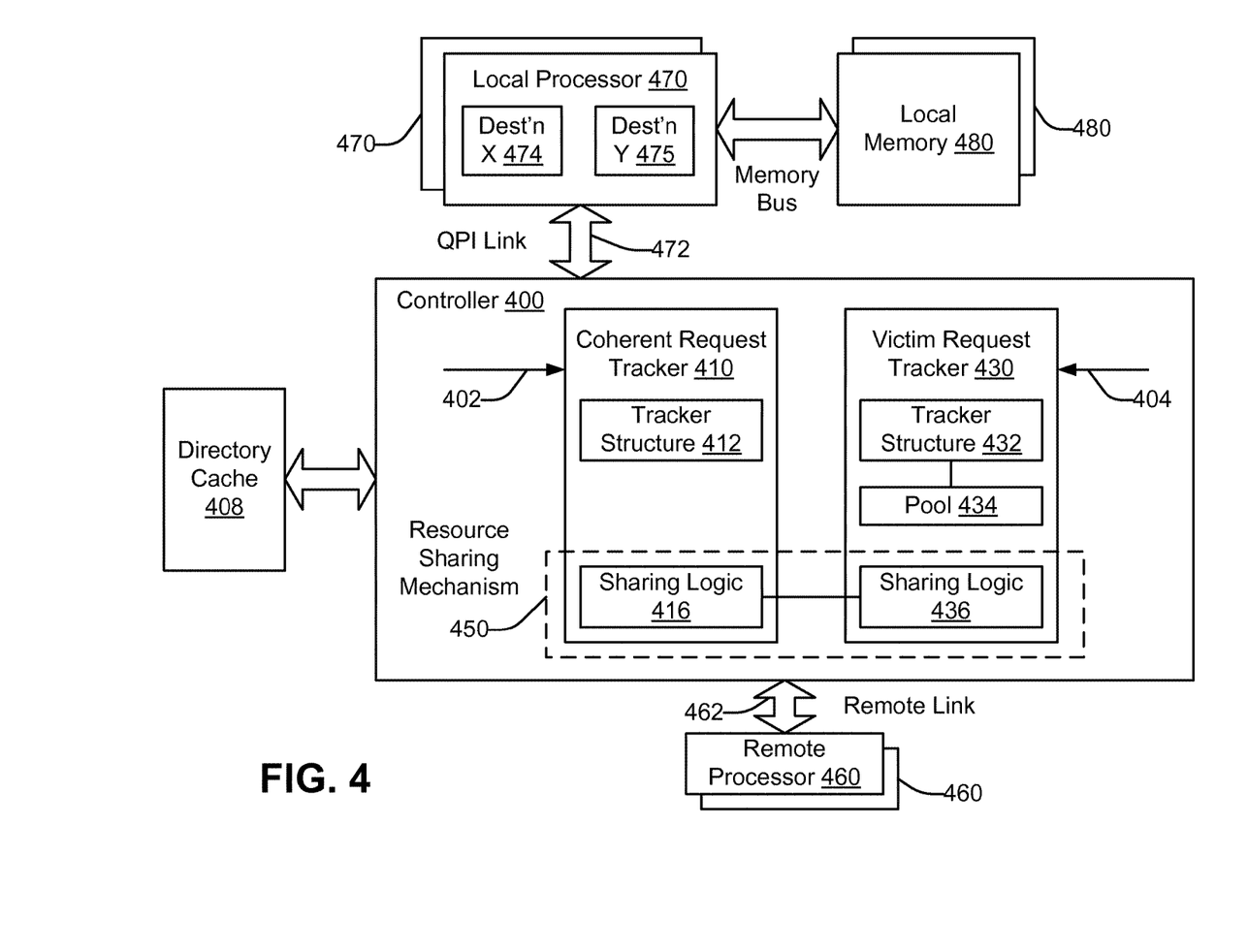
FIG. 4 is a block diagram representation of a controller for managing a set of transaction identifiers in a point-to-point interconnect scheme in a computer system, in accordance with an embodiment of the present disclosure.

Consider now, and with reference to FIG. 4, a controller 400 for managing a set of transaction identifiers in a point-to-point interconnect scheme in a computer system. The controller 400 receives memory access requests from a remote processor 460 in the system via remote link 462. These requests typically are for access to a local memory 480 that is managed by a memory controller (not shown) in a local processor 470. The local processor 470 is communicatively coupled to the controller 400 via a point-to-point interconnection link 472. The controller 400 may be coupled to one or more remote processors 460 and one or more local processors 470. Each local processor 470 typically controls a corresponding local memory 480.

The memory requests received from the remote processor 460 by the controller 400, which may be referred to as "coherent" requests, may include memory read requests for the controller 400 to provide data stored in certain location (s) in the local memory 480 to the remote processor 460, and memory write requests that include data from the remote processor 460 that is to be stored in certain location(s) in the local memory 480. The local processor 470 typically maintains an internal data cache (not shown) that can provide faster access to a portion of the contents of local memory 480, and so the memory locations associated with a coherent request may be referred to as a "cache line".

The controller 400 maintains a directory cache 408 communicatively coupled to it to track ownership of the cache lines that have been requested by the remote processor(s) 460. For example, the remote processor 460 may issue a memory read request to the controller 400, and after the controller 400 has provided the data for the requested cache line to the remote processor 460, the remote processor 460 may modify the data for that cache line locally. However, the modified data is different from the data for that cache line stored in the local memory 480. To maintain the integrity of the data in the local memory 480, the controller uses a directory cache 408 that is communicatively coupled to the controller 400 to track the ownership by the remote processor 460 of the cache line. In processing coherent requests, the controller 400 uses the directory cache 408 to determine where the most current copy of data for a particular cache line is located. If a cache line address is not found in the directory cache 408, then no remote processor has the line encached, and the copy in the local memory 480 is up-to-date. If a cache line address is found in the directory cache 408, then the cache line is encached by a remote processor (or processors) and the directory cache entry identifies the processor(s).

The directory cache 408 may be internal to or external to the controller 400. Since the directory cache 408 typically is not large enough to track ownership of all possible cache lines, from time-to-time the controller 400 deletes (or "evicts") certain older ownership entries ("victims") from the directory cache in order to make room in the directory cache 408 for tracking ownership of more recently requested cache lines. When evicting a cache line, the controller 400 issues a "snoop" request to the remote processor 460 that owns that cache line to determine whether the cache line data is different from that stored in the local memory 480. If so, the controller 400 will obtain the modified data from the remote processor 460 and issue a memory write request to the local processor 470 to write the modified data to the local memory 480.

The link 472 operates according to a protocol that supports multiple concurrently active ("in-process" or "in-flight") transactions between the controller 400 and the local processor 470. The maximum number of concurrently active transactions may be predetermined, or alternatively may be determined by the local processor 470 and communicated to the controller 400. Each active transaction has an associated transaction identifier. The transaction identifiers define the fixed or limited set of resources available for transactions using the link 472. In some examples, the link 472 may be an Intel® QuickPath Interconnect (QPI) link.

The controller 400 includes a coherent request tracker 410 that manages the coherent requests. In response to a signal 402, the coherent request tracker 410 assigns a transaction identifier to each coherent read or write request issued to the local processor 470. The coherent request tracker 410 typically is structured in the same or similar manner as, and functions in the same or similar manner as, first tracker 210 (FIG. 2) and/or first tracker 310 (FIG. 3). As such, the coherent request tracker 410 includes a tracker structure 412, and sharing logic 416 that is part of a resource sharing mechanism 460. In some examples, the coherent request tracker 410 may further use the assigned transaction identifier to send the request to the local processor 470 via the link 472. In other examples, the coherent request tracker 410 may provide the assigned transaction identifier to another module of the controller 400 to issue the request to the local processor 470 via the link 472. Coherent requests may be considered as "in band" operations of the system that define or affect overall system throughput or performance. Statically assigning or allocating a sufficient number of transactions identifiers to the coherent request tracker 410—identifiers that can be quickly and efficiently assigned to coherent requests since they are statically assigned to corresponding entries in the tracker structure 412—can advantageously improve or maximize system performance and throughput.

The controller 400 also includes a victim request tracker 430 that manages the writes to local memory 480 that are associated with the eviction of an entry from the directory cache 408. In this regard, the victim request tracker 430 looks at a directory cache entry that has been evicted, and issues snoop(s) to the remote processor(s) identified by the entry. In some situations, a remote processor may have had exclusive ownership of a cache line it encached, and has modified the data. If data has been modified by the remote processor, the remote processor will respond to the snoop by sending the modified cache line data back to the victim request tracker 430, which in turn initiates a write of the cache line data to the local memory 480. The modified cache line data may constitute the signal 404 received by the victim request tracker 430. In response to the signal 404, the victim request tracker 430 assigns a transaction identifier to each memory write request it issues to the local processor 470. The victim request tracker 430 typically is structured as, and functions as, second tracker 230 (FIG. 2) and/or second tracker 330 (FIG. 3). As such, the victim request tracker 430 includes a tracker structure 432, a resource pool 434, and sharing logic 436 that is part of the resource sharing mechanism 460. In some examples, the victim request tracker 430 may further use the assigned transaction identifier to send the request to the local processor 470 via the link 472. In other examples, the victim request tracker 430 may provide the assigned transaction identifier to another module of the controller 400 to issue the request to the local processor 470 via the link 472. Memory write requests associated with directory cache eviction events may be considered as "out of band" operations of the system that do not significantly affect overall system throughput or performance—providing that there are sufficient transaction identifiers available to accommodate the number of such requests that are currently active. The resource borrowing mechanism 460 enables the victim request tracker 430 to borrow idle transaction identifiers from the coherent request tracker 410 as needed to respond to high demand. Since these memory writes are out of band operations, the overhead involved with borrowing a transaction identifier and dynamically associating the identifier with a particular entry in the tracker structure 432 does not adversely affect system throughput or performance.

In some examples, a local processor 470 may include plural destinations, such as destination X 474 and destination Y 475, to which a memory request may be directed. In a QuickPath Interconnect link, each different home agent for a memory controller in the local processor 470 may be considered a different destination.

Figure 5:
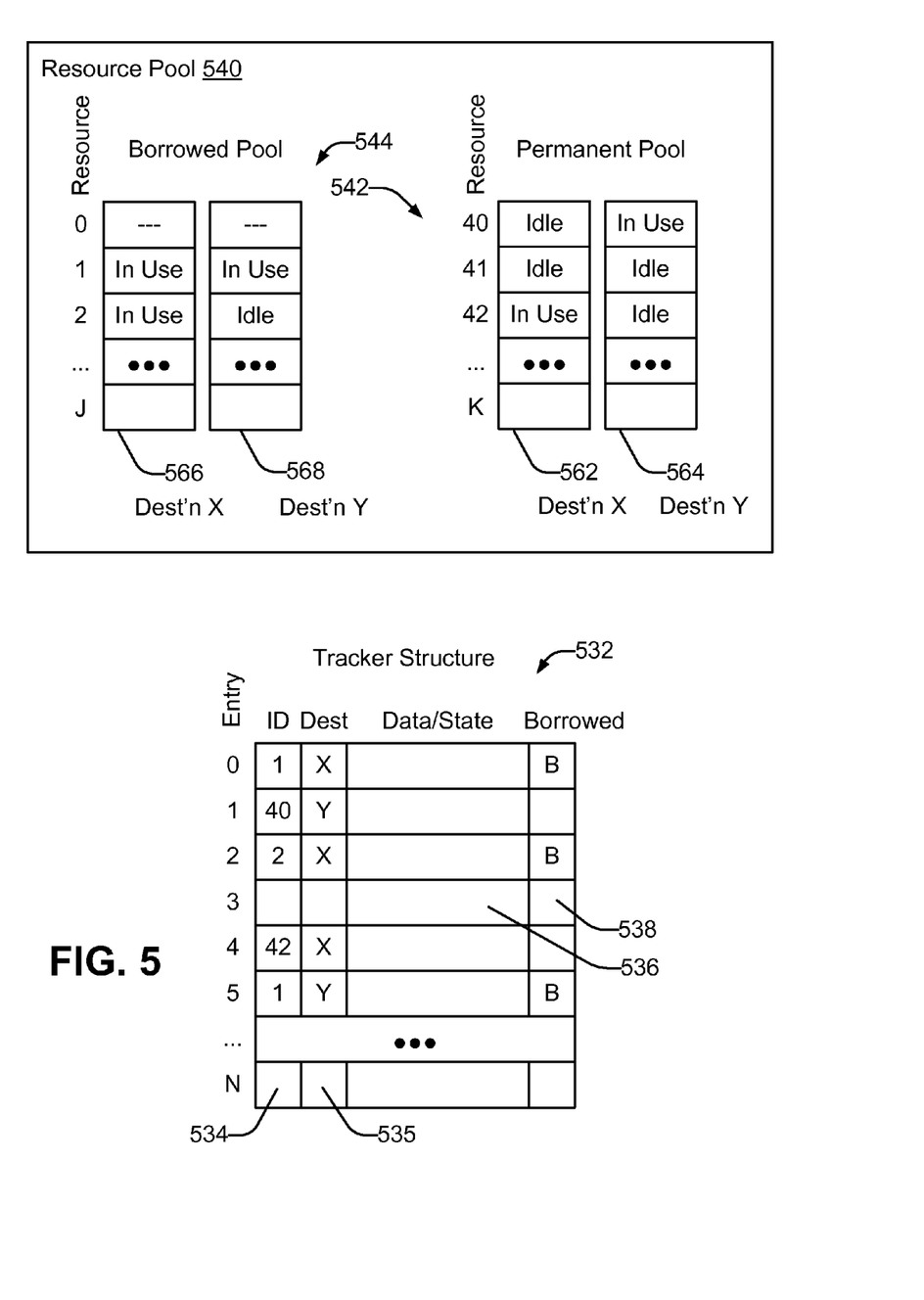
FIG. 5 is a block diagram representation of a resource pool and a tracker structure usable with a tracker which borrows resources from another tracker, in accordance with an embodiment of the present disclosure.

Consider now in greater detail, and with reference to FIG. 5, a resource pool 540 and a tracker structure 532, which are usable with a tracker configured to borrow resources from another tracker. As has been discussed heretofore, second trackers 230 (FIG. 2) and 330 (FIG. 3), and victim request tracker 430 (FIG. 4), are examples of trackers which can borrow resources from another tracker.

The resource pool 540 includes a permanently-assigned sub-pool 542 and a borrowed sub-pool 544. Each sub-pool 542, 544 includes a resource table for each destination which can be utilized with the borrowing tracker. For example, victim request tracker 430 (FIG. 4) can direct memory requests to destination X 474 and destination Y 475. Resource tables 562, 566 can be associated with transactions to destination X 474, while resource tables 564, 568 can be associated with transactions to destination Y 475.

For the permanently-assigned sub-pool 542, each resource table 562, 564 has an entry for each resource in the fixed or limited set of resources that is permanently assigned to the tracker. In the example illustrated, the resource tables 562, 564 have entries numbered 40 through K corresponding to the resources that are permanently assigned to the tracker. The value of each table entry indicates the state of the corresponding resource. The state of a resource is "In Use" if the resource is present in the sub-pool and is presently associated with an active transaction, or "Idle" if the resource is present in the sub-pool but is not presently associated with an active transaction.

For the borrowed sub-pool 544, each resource table 566, 568 has an entry for each resource in the fixed or limited set of resources that is permanently assigned to the tracker. In the example illustrated, the resource tables 566, 568 have entries numbered 0 through J corresponding to the subset of resources which may be borrowed for use by the tracker. In addition to the "In Use" and "Idle" states, a table entry may also have the value of "Not Borrowed" (denoted by "---") if the resource is not presently borrowed from another tracker and thus not presently included in the borrowed sub-pool 544. For example, in the permanently-assigned sub-pool 542, resource 42 is In Use for destination X and Idle for destination Y. In the borrowed sub-pool 544, the state of resource 0 is presently indicated as Not Borrowed, and thus resource 0 cannot presently be used by the tracker.

The example tracker structure 532 reflects the state of the resource tables 562-568 in the pools 542, 544. The tracker structure 532 has a corresponding entry 0 through N for each "In Use" resource in the resource tables 562-568. Each entry in the tracker structure 532 includes a resource identifier ("ID") field 534; a destination ("Dest") field 535; a borrowed field 538; and a data/state field 536. The resource identifier field 534, destination field 535, and borrowed field 538 link each entry to the resource pool 340. When the tracker receives a request for a resource for a particular destination, the resource tables associated with that destination are easily searched to locate an Idle resource (if one exists) to assign to the request.

In environments where there is a single destination, the destination field 535 can be omitted from the tracker structure 532 and a single resource table can be used for each resource sub-pool 542, 544.

Figure 6:
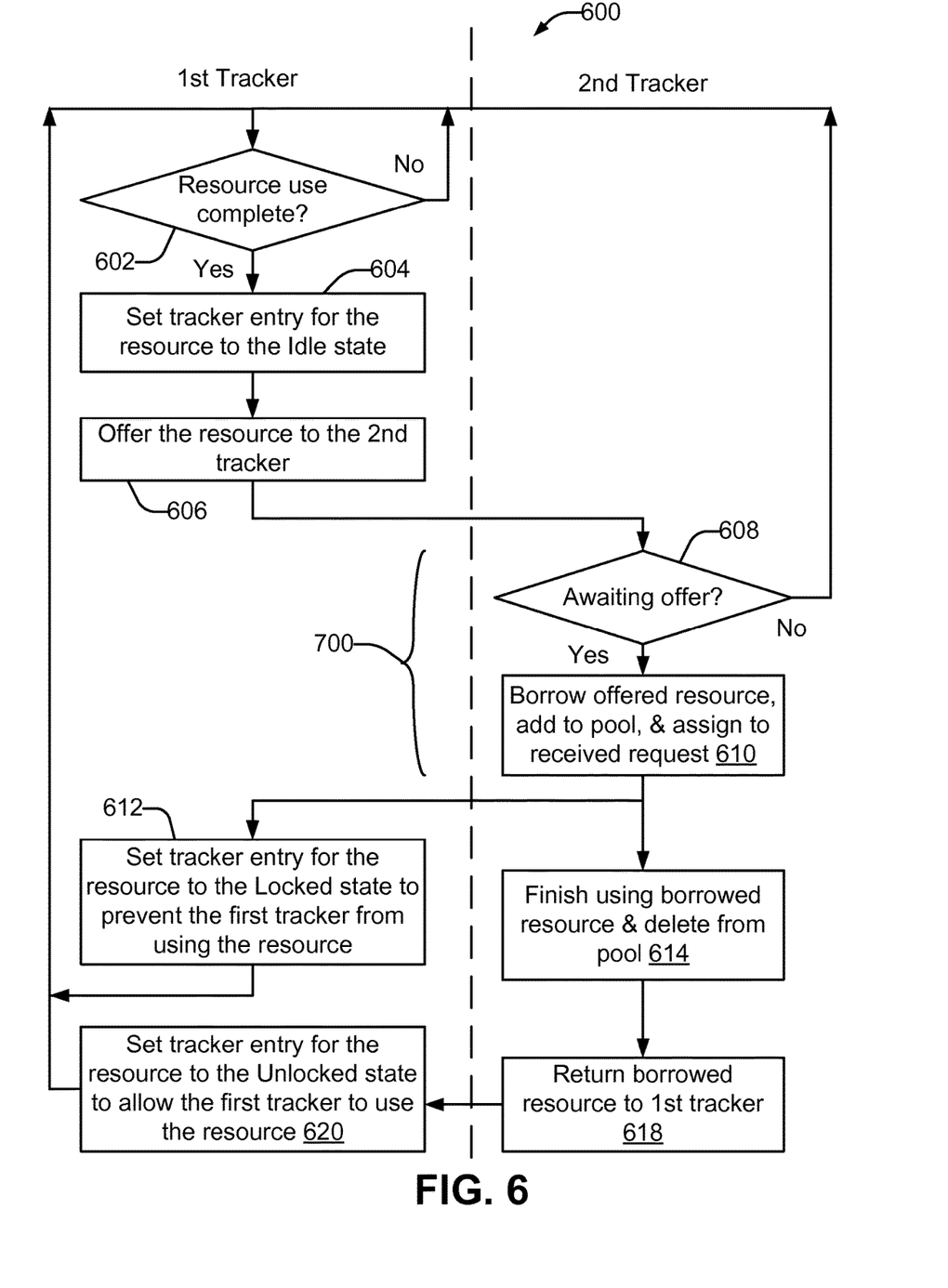
FIG. 6 is a flowchart in accordance with an embodiment of the present disclosure of a method of managing a set of resources.

Consider now, with reference to FIG. 6, a flowchart of a controller for managing a fixed or limited set of resources. In various examples, the controller may be the controller 200 (FIG. 2), 300 (FIG. 3), or 400 (FIG. 4). Alternatively, the blocks of the flowchart of FIG. 6 may be considered as steps in a method implemented in the controller. More specifically, different portions of the flowchart or method may be implemented by different trackers in the controller. In some examples, the blocks may include computer-readable instructions stored in a memory, such as memory 222 of a first tracker and memory 242 of a second tracker, and executed by the corresponding processor 220, 222 of the trackers.

In a method 600, a resource is statically associated with a particular entry in a first tracker structure of a first tracker in the controller. At 602, the first tracker determines whether use of a resource by the first tracker has been completed. Where the resource is a transaction identifier, for example, the first tracker may determine that use of the transaction identifier has been completed when a response to a memory access request issued by the tracker to a target, such as a local processor, has been received from the target by the first tracker or by another module of the controller.

Note that, for simplicity, the method 600 does not illustrate the prior operations by which the first tracker receives from the controller a request for a resource; locates an entry in the first tracker structure having an idle state value (indicating that the resource statically associated with the entry is idle); assigns to the request the resource corresponding to the idle first entry; changes the state of that entry to an in-use state; and uses the resource for the requested transaction.

If no resource use has been completed ("No" branch of 602), the first tracker loops back to 602. If resource use is complete ("Yes" branch of 602), then at 604 the first tracker changes the corresponding tracker structure entry from the in-use state to the idle state. At 606, the first tracker offers, to a second tracker, the resource whose use has been completed. At 608, the second tracker determines whether it is awaiting an offer of a resource from the first tracker. The second tracker, as will be described subsequently with reference to FIG. 7, may be awaiting an offered resource because it has received a resource request from the controller but has no resource in the pool that is presently available for use by a new request.

If the second tracker is not awaiting an offered resource ("No" branch of 608), then the second tracker does not borrow the offered resource and the method loops back to 602. If the second tracker is awaiting a resource offer ("Yes" branch of 608), then at 610 the second tracker borrows the offered resource, adds the borrowed resource to a dynamic pool of resources associated with the second tracker, and assigns the borrowed resource to a request that is pending at the second tracker. In conjunction with assigning the resource to the request, the second tracker enters an identifier of the assigned resource in an unassigned entry of the tracker structure in the second tracker. An unassigned entry may be one which has no resource identifier (ID) associated with or assigned to it.

At 612, in response to the second tracker borrowing the resource offered to it by the first tracker, the first tracker sets the tracker structure entry for the resource to the Locked state to prevent the first tracker from using the resource while it is borrowed by the second tracker, and the first tracker loops back to 602.

At 614, the second tracker finishes using the borrowed resource. Where the resource is a transaction identifier, for example, the second tracker may utilize the borrowed transaction identifier to issue to a local processor a memory write associated with a cache eviction event being performed by the controller. The second tracker determine that it is finished using the borrowed resource at some point after the memory write transaction has been completed by the local processor. After the second tracker finishes using the borrowed resource, the second tracker deletes the borrowed resource from the resource pool. At 618, the second tracker returns the borrowed resource to the first tracker. At 620, in response to the return of the borrowed resource, the first tracker sets the tracker structure entry that corresponds to the resource to the Unlocked state, and the first tracker is then free to use the returned resource for another request received at the first tracker.

While the operations performed by the second tracker at 608, 610, 614, 616, 618 are illustrated in a sequential manner for clarity, it is to be understood that multiple resources may be borrowed and used concurrently by the second tracker. As such, the second tracker may finish using different ones of these borrowed resources (step 614) at different times, and then delete the resource from the pool (step 616) and return it to the first tracker (step 618).

Figure 7:
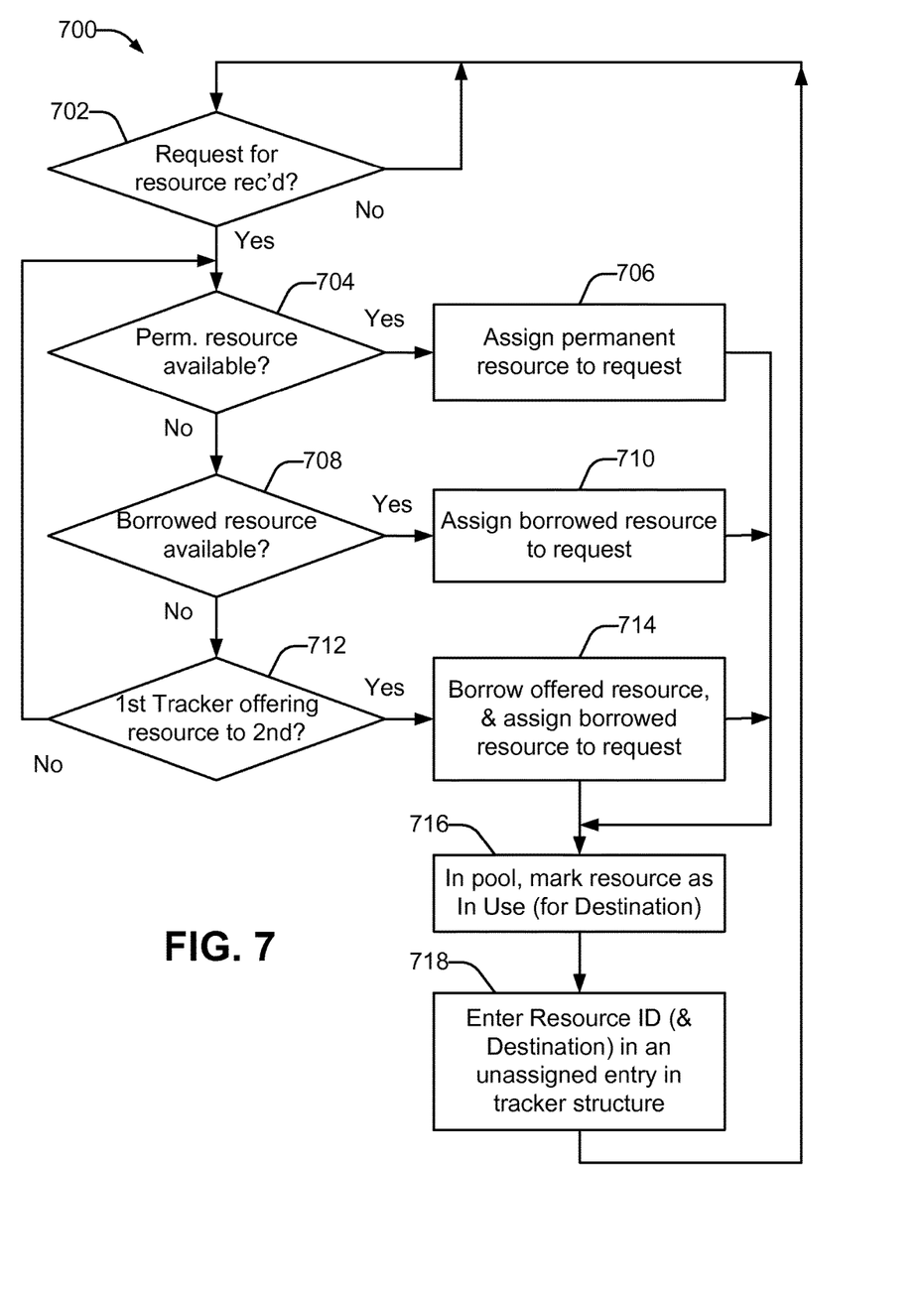
FIG. 7 is a lower-level flowchart in accordance with an embodiment of the present disclosure of a portion of the flowchart of FIG. 6 that involves a second tracker borrowing a resource offered by a first tracker.

Considering now, with reference to FIG. 7, a lower-level flowchart of a method 700 of the operation of the second tracker in awaiting 608 an offered resource and borrowing 610 the offered resource, at 702 it is determined whether a request for a resource has been received at the second tracker. If not ("No" branch of 702), the operation loops back to 702. If so ("Yes" branch of 702), then it is determined whether a permanently-assigned resource is available. A resource is "available" if the entry in the resource table of the resource sub-pool that corresponds to the resource is in the "Idle" state. Where the tracker supports multiple destinations, the resource table to be examined is the resource table that corresponds to the specified destination. For example, in the permanently-assigned sub-pool 542 (FIG. 5), resources 41 and 42 are available in the resource table 562 for destination X.

If a permanently-assigned resource is available ("Yes" branch of 704), then at 706 the resource is assigned to the request. At 716, the entry in the resource table of the resource sub-pool is changed from the "Idle" state to the "In Use" state, and at 718 the resource identifier is entered in an unassigned entry of the tracker structure. For example, entry 3 in the tracker scoreboard 532 (FIG. 5) is unassigned and, if resource 41 is selected for destination X, resource identifier 41 may be entered in the resource identifier field 534 of entry 3. In addition, the destination X may be entered in the destination field 535 of entry 3. The method then branches to 702.

If a permanently-assigned resource is not available ("No" branch of 704), then at 708 it is determined whether a borrowed resource is available. For example, in the borrowed sub-pool 544 (FIG. 5) resource 2 is available in the resource table 568 for destination Y. If a borrowed resource is available ("Yes" branch of 708), then at 710 the resource is assigned to the request. At 716, the entry in the resource table of the resource sub-pool is changed from the "Idle" state to the "In Use" state, and at 718 the resource identifier is entered in an unassigned entry of the tracker structure. For example, entry 3 in the tracker scoreboard 532 (FIG. 5) is unassigned and, if resource 2 is selected for destination Y, resource identifier 2 may be entered in the resource identifier field 534 of entry 3. In addition, the destination Y may be entered in the destination field 535 of entry 3. The method then branches to 702.

If a borrowed resource is not available ("No" branch of 708), then at 712 it is determined whether the first tracker is offering a resource to the second tracker. If not ("No" branch of 712), the method loops back to 704 to again check for available resources, since use of a resource may be completed and the resource made available in the interim.

If the first tracker is offering a resource to the second tracker ("Yes" branch of 712), then at 714 the second tracker borrows the offered resource and assigns it to the request. For example, assume that the first tracker offers resource 0 to the second tracker (in the borrowed pool 544, resource 0 is in the "Not Borrowed" state as indicated by "---"), and the second tracker borrows this resource and assigns it to the request. At 716, the entry in the resource table of the resource sub-pool is changed from the "---" state to the "In Use" state. Where a destination is associated with the request, the second tracker sets the resource table entry corresponding to the borrowed resource for the destination to the "In Use" state for the resource table corresponding to the destination, and sets the resource table entry corresponding to the borrowed resource to the "Idle" state for other destinations. At 718, the resource identifier is entered in an unassigned entry of the tracker structure. For example, entry 3 in the tracker scoreboard 532 is unassigned and, if resource 0 is selected for destination X, resource identifier 0 may be entered in the resource identifier field 534 of entry 3. In addition, the destination X may be entered in the destination field 535 of entry 3. The method then branches to 702.

Figure 8:
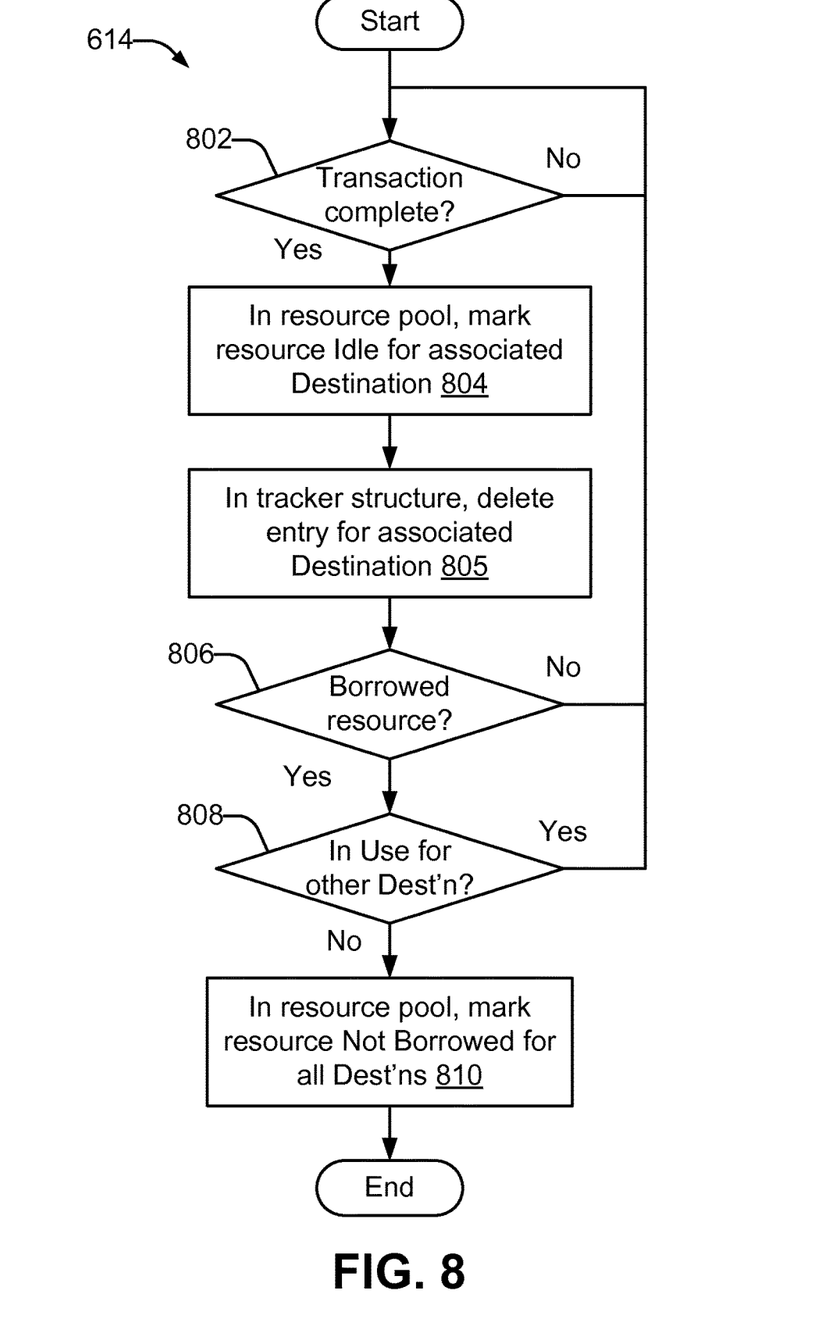
FIG. 8 is a lower-level flowchart in accordance with an embodiment of the present disclosure of a portion of the flowchart of FIG. 6 that involves the second tracker finishing use of a resource borrowed from a first tracker.

Considering now, with reference to FIG. 8, a lower-level flowchart of the operation of the second tracker in finishing 614 use of a borrowed resource and deleting it from the resource pool, at 802 the second tracker determines if a transaction using the resource has been completed. If not ("No" branch of 802), operation loops back to 802.

If a transaction has been completed ("Yes" branch of 802), then at 804 the entry in the resource table that corresponds to the completed transaction is changed from "In Use" to "Idle". Then at 805, the entry in the tracker structure that corresponds to the completed transaction is deleted. As a first example, if the transaction to destination X of permanently-assigned resource 42 has been completed, then the entry for resource 42 in the destination X resource table 562 of the permanent sub-pool 544 is changed from "In Use" to "Idle", and entry 4 in the tracker structure 532 is deleted. As a second example, if the transaction to destination Y of borrowed resource 1 has been completed, then the entry for resource 1 in the destination Y resource table 568 of the borrowed sub-pool 542 is changed from "In Use" to "Idle", and entry 5 in the tracker structure 532 is deleted. As a third example, if the transaction to destination X of borrowed resource 2 has been completed, then the entry for resource 2 in the destination X resource table 566 of the borrowed sub-pool 542 is changed from "In Use" to "Idle", and entry 2 in the tracker structure 532 is deleted. In some examples, an entry in the tracker structure 532 may be deleted by setting one or more fields, such as for example resource identifier field 534, to an "Unassigned" value.

At 806, it is determined whether the resource associated with the completed transaction is a borrowed resource. If not ("No" branch of 806), then operation loops back to 802. If so ("Yes" branch of 806), then at 808 it is determined whether the borrowed resource associated with the completed transaction is in the "In Use" state for any other destination. If so ("Yes" branch of 808), then operation loops back to 802 since the borrowed resource is not in the "Idle" state for all destinations. For instance, in the second example above, borrowed resource 1 remains in the "In Use" state for destination X after the transaction to destination Y has been completed, and consequently the use by the second tracker of borrowed resource 1 is not finished.

If the borrowed resource is not in use for any other destination, and thus in the "Idle" state for all destinations ("No" branch of 808), then at 810 the corresponding entry in the resource table of the borrowed resource sub-pool 544 is set to the "Not Borrowed" ("---") state for all destinations. For instance, in the third example above, the entry for borrowed resource 2 in both the destination X resource table 566 and the destination Y resource table 568 will be in the "Idle" state after the transaction to destination X has been completed. Consequently, the entry for borrowed resource 2 in both resource resource tables 566, 568 will be set to the "Not Borrowed" ("---") state, and the method completed.

From the foregoing it will be appreciated that the controllers and methods provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A cache controller for managing resources, comprising:
   a first tracker structure, in a coherent request tracker, having first tracker entries each statically associated with one of a first set of transaction identifiers that are assigned to the coherent request tracker for use by the coherent request tracker to manage coherent requests issued to a processor external to the cache controller;
   a second tracker structure, in a victim request tracker, having second tracker entries each dynamically associable with one of a second variable set of the transaction identifiers that are assigned to the victim request tracker for use by the victim request tracker to manage writes to a memory that are associated with eviction of entries from a directory cache;
   a resource sharing mechanism to, in response to determining that no transaction identifier in the second variable set of the transaction identifiers is available to process a resource request from the cache controller, borrow an idle transaction identifier associated with a first tracker entry among the first tracker entries, associate the borrowed transaction identifier with a second tracker entry among the second tracker entries, and lock the first tracker entry; and
   the victim request tracker to assign the borrowed transaction identifier to the resource request.

2. The cache controller of claim 1, wherein the resource sharing mechanism returns the borrowed transaction identifier by unlocking the first tracker entry associated with the borrowed transaction identifier when supply of the second tracker entries exceeds demand for the second tracker entries.

3. The cache controller of claim 1, wherein each first tracker entry has a state field that directly indicates whether a transaction identifier corresponding to the first tracker entry is idle and a locked field that indicates whether the corresponding transaction identifier is associated with the second tracker structure.

4. The cache controller of claim 1, wherein each second tracker entry has a resource identifier field that identifies a transaction identifier corresponding to the second tracker entry, and a borrowed field that indicates whether the corresponding transaction identifier is borrowed from the first tracker structure.

5. A cache controller for managing resources, comprising:
   a first structure, in a coherent request tracker, having first entries each statically associated with, and directly denoting a state of, one of a first fixed set of transaction resources that are assigned to the coherent request tracker for use by the coherent request tracker to manage coherent requests issued to a processor external to the cache controller;
   a second structure, in a victim request tracker, having second entries each dynamically associable with, and identifying, a resource in a variable-size pool of a second variable set of the transaction identifiers assigned to the victim request tracker for use by the victim request tracker to manage writes to a memory that are associated with eviction of entries from a directory cache;
   a resource sharing mechanism to, in response to determining that no transaction identifier in the second variable set of the transaction identifiers is available to process a resource request from the cache controller, borrow from the coherent request tracker a transaction identifier in an idle state and assign the borrowed transaction identifier to the victim request tracker; and
   the cache controller to process the resource request using the borrowed transaction identifier associated with the second entry.

6. The cache controller of claim 5, wherein the resource sharing mechanism comprises:
   a deallocation arbiter in the coherent tracker to offer a particular transaction identifier to the victim request tracker when the particular transaction identifier changes from an in-use state to the idle state; and
   an allocation engine in the victim request tracker, coupled to the deallocation arbiter, to determine whether to borrow the offered transaction identifier.

7. The cache controller of claim 6, wherein the deallocation arbiter sets, in the first structure, the state of the first entry that corresponds to the borrowed transaction identifier to a locked state while the borrowed transaction identifier is assigned to the victim request tracker to prevent the coherent tracker from using the borrowed transaction identifier.

8. The cache controller of claim 6, wherein the allocation engine is further configured to:
   add the borrowed transaction identifier to the pool,
   responsive to a resource request from the cache controller, select the borrowed transaction identifier from the pool and enter an identifier of the transaction identifier in an unassigned second entry.

9. The cache controller of claim 5, wherein the resource sharing mechanism returns the borrowed transaction identifier to the coherent request tracker when the victim request tracker is finished using the borrowed transaction identifier by removing the borrowed transaction identifier from a pool of resources in the victim request tracker and setting the first entry which corresponds to the borrowed transaction identifier to the unlocked state.

10. The cache controller of claim 6, wherein the pool includes a sub-pool of transaction identifiers permanently assigned to the victim request tracker and a sub-pool of transaction identifiers borrowed from the coherent request tracker and temporarily assigned to the victim request tracker.

11. The cache controller of claim 5, wherein each transaction identifier is a transaction identifier for an in-process memory transaction on a link between the cache controller and the processor, the processor including a memory controller for a memory attached to the processor.

12. The cache controller of claim 11, wherein a maximum number of in-process memory transactions concurrently allowable is specified to the cache controller by the processor.

13. The cache controller of claim 11,
wherein the coherent request tracker receives a memory access request from a remote processor, assigns a transaction identifier to the request, and uses the transaction identifier to send the access request to the local processor via the link, and
wherein the victim request tracker receives modified data from a remote processor in response to a cache eviction event, generates a memory write request for the modified data including a transaction identifier, and uses the transaction identifier to send the write request to the processor via the link.

14. A method of managing a plurality of transaction identifiers, comprising:
a coherent request tracker in a cache controller offering, to a victim request tracker in the cache controller, one of the plurality of transaction identifiers statically associated with a first entry in a first structure in the coherent request tracker for use by the coherent request tracker to manage coherent requests issued to a processor external to the cache controller, the offering automatically performed responsive to a transition of the first entry to an idle state;
the victim request tracker determining to borrow the offered transaction identifier in response to determining that no transaction identifier in a dynamic pool of transaction identifiers assigned to the victim request tracker is available to process a resource request from the cache controller;
the second tracker adding the borrowed transaction identifier to the dynamic pool of resources for use by the victim request tracker to manage writes to a memory that are associated with eviction of entries from a directory cache;
the second tracker associating the borrowed transaction identifier with a second entry in a second structure in the victim request tracker;
the coherent request tracker setting the first entry to a locked state to prevent the coherent request tracker from using the borrowed transaction identifier; and
the victim request tracker assigning the borrowed transaction identifier to the resource request.

15. The method of claim 14, comprising:
the victim request tracker receiving a request for a resource from the cache controller;
in response to the receiving, the victim request tracker assigning an available transaction identifier in the pool to the request and entering an identifier of the assigned transaction identifier in an unassigned entry of a second structure in the victim request tracker.

16. The method of claim 15, wherein the victim request tracker includes a transaction identifier permanently assigned to the victim request tracker, and wherein the assigning comprises:
if a permanently-assigned transaction identifier is available, assigning the permanently-assigned transaction identifier to the request; and
if no permanently-assigned transaction identifier is available and a borrowed transaction identifier is available, assigning the borrowed transaction identifier to the request.

17. The method of claim 16, wherein the request includes a requested destination, and wherein a borrowed transaction identifier is determined as available if the borrowed transaction identifier has an idle state for the requested destination.

18. The method of claim 14, comprising:
the victim request tracker determining that use of the borrowed transaction identifier is complete;
the victim request tracker deleting the borrowed transaction identifier from the pool and returning the borrowed transaction identifier to the coherent request tracker; and
the coherent request tracker setting the first entry in the first tracker structure to the unlocked state to allow the coherent request tracker to use the returned transaction identifier.

19. The method of claim 18,
wherein the borrowed transaction identifier is concurrently assignable to a plurality of resource requests received by the victim request tracker, each request having a different destination; and
wherein use the borrowed transaction identifier is determined to be complete when the borrowed transaction identifier is in an idle state for all destinations assigned to the borrowed transaction identifier.

20. The cache controller of claim 1, wherein:
the processor is a local processor including a memory controller for a memory attached to the local processor,
each transaction identifier is a transaction identifier for an in-flight transaction between the cache controller and the local processor, and
the coherent request tracker and victim request tracker command the local processor by issuing to the local processor a memory access operation using the transaction identifier.

21. A method of managing a plurality of transaction identifiers, comprising:
a coherent request tracker in a cache controller offering to a victim request tracker in the cache controller a transaction identifier statically associated with a first entry in a first structure in the coherent request tracker for use by the coherent request tracker to manage coherent requests issued to a processor external to the cache controller, the offering responsive to a transition of the first entry to an idle state, wherein the first structure has first tracker entries each statically associated with one of the transaction identifiers;
the victim request tracker in the cache controller determining to borrow the offered transaction identifier in response to determining that no transaction identifier in a dynamic pool of transaction identifiers assigned to the victim request tracker is available to process a resource request from the cache controller;
the victim request tracker adding the borrowed transaction identifier to the dynamic pool of transaction identifiers for use by the victim request tracker to manage writes to a memory that are associated with eviction of entries from a directory cache by associating the borrowed transaction identifier with a second entry in a second structure in the victim request tracker, the borrowed transaction identifier concurrently assignable to a plurality of resource requests received by the victim request tracker, each request having one of a plurality of destinations;

the coherent request tracker locking the first entry to prevent use of the borrowed transaction identifier by the coherent request tracker;

the cache controller processing the resource request using the borrowed transaction identifier associated with the second tracker entry;

the victim request tracker determining that use of the borrowed transaction identifier is complete when the borrowed transaction identifier is in an idle state for all assigned destinations; and the victim request tracker deleting the borrowed transaction identifier from the pool and returning the borrowed transaction identifier to the coherent request tracker, the coherent request tracker setting the first entry to the unlocked state to allow the first tracker to use the returned transaction identifier in response to the borrowed transaction identifier being returned.

* * * * *